(12) United States Patent
Wilson et al.

(10) Patent No.: US 12,084,170 B2
(45) Date of Patent: *Sep. 10, 2024

(54) AIRCRAFT LANDING GEAR WITH PIVOTING DRIVE TRANSMISSION

(71) Applicant: AIRBUS OPERATIONS LIMITED, Bristol (GB)

(72) Inventors: Fraser Wilson, Bristol (GB); Jeremy Bedarrides, Toulouse (FR); Vladimir Platagea, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,115

(22) Filed: Mar. 6, 2023

(65) Prior Publication Data

US 2023/0202647 A1  Jun. 29, 2023

Related U.S. Application Data

(60) Division of application No. 16/720,489, filed on Dec. 19, 2019, now Pat. No. 11,628,931, which is a continuation of application No. 15/199,795, filed on Jun. 30, 2016, now Pat. No. 10,562,615, which is a continuation of application No. 14/178,141, filed on Feb. 11, 2014, now Pat. No. 9,428,266, which is a continuation of application No. 13/392,584, filed as application No. PCT/EP2010/061343 on Aug. 4, 2010, now Pat. No. 8,684,300.

(30) Foreign Application Priority Data

Aug. 28, 2009 (GB) .................................. 0915009
May 6, 2010 (GB) .................................. 1007562

(51) Int. Cl.
*B64C 25/32* (2006.01)
*B64C 25/58* (2006.01)

(52) U.S. Cl.
CPC ............ *B64C 25/405* (2013.01); *B64C 25/58* (2013.01)

(58) Field of Classification Search
CPC ..................................................... B64C 25/405
See application file for complete search history.

(56) References Cited

U.S. PATENT DOCUMENTS 5,242,131 A * 9/1993 Watts ...................... B64C 25/34
244/50
8,684,300 B2 * 4/2014 Wilson .................. B64C 25/405
244/50

(Continued)

*Primary Examiner* — Jessica B Wong
(74) *Attorney, Agent, or Firm* — Nixon & Vanderhye P.C.

(57) ABSTRACT

An aircraft landing gear is disclosed including a shock-absorbing main leg having a sprung part for attachment to an aircraft and an un-sprung part including a slider and an axle carrying at least one wheel, the wheel having a toothed ring gear; a drive transmission mounted externally on the sprung part, or on the un-sprung part, of the main leg, the drive transmission having at least one motor and a drive pinion for meshing with the toothed ring of the wheel; and an actuator for lifting the drive transmission into and out of driving engagement with the toothed ring and for maintaining the driving engagement as the landing gear deflects during a ground taxiing operation. Also, a method of operating the aircraft landing gear.

20 Claims, 7 Drawing Sheets

(56) References Cited

U.S. PATENT DOCUMENTS

| | | | |
|---|---|---|---|
| 9,428,266 B2* | 8/2016 | Wilson | B64C 25/405 |
| 10,562,615 B2* | 2/2020 | Wilson | B64C 25/405 |
| 11,628,931 B2* | 4/2023 | Wilson | B64C 25/405 |
| | | | 244/50 |

* cited by examiner

AIRCRAFT LANDING GEAR WITH PIVOTING DRIVE TRANSMISSION

CROSS-REFERENCE TO RELATED APPLICATIONS

The present application is a Divisional of U.S. application Ser. No. 16/720,489, filed Dec. 19, 2019, now allowed; which is a Continuation of U.S. application Ser. No. 15/199,795, filed Jun. 30, 2016, now U.S. Pat. No. 10,562,615, issued Feb. 18, 2020; which is a Continuation of U.S. application Ser. No. 14/178,141, filed Feb. 11, 2014, now U.S. Pat. No. 9,428,266, issued Aug. 30, 2016; which is a Continuation of U.S. application Ser. No. 13/392,584, filed on Feb. 27, 2012, now U.S. Pat. No. 8,684,300, issued Apr. 1, 2014; which is a National Phase of International Application Number PCT/EP2010/061343, filed Aug. 4, 2010, and claims priority to Great Britain (GB) Application Number 0915009.5, filed Aug. 28, 2009, and Great Britain (GB) Application Number 1007562.0, filed May 6, 2010, the entire contents of each of which are hereby incorporated by reference.

FIELD OF THE INVENTION

The present invention relates to an aircraft landing gear including a shock-absorbing main leg having a sprung part for attachment to an aircraft and an un-sprung part including a slider and an axle carrying at least one wheel. In particular, the invention relates to a drive for rotating the wheel whilst the aircraft is on the ground. The invention also relates to a method of operating the landing gear.

BACKGROUND OF THE INVENTION

Most aircraft ground taxi by using thrust produced by their main engine(s). As a result of the ground taxi speeds being relatively low the engines must be run at low power. This means there is relatively high fuel consumption as a result of the poor propulsion efficiency at this low forward velocity. This leads to an increased level of both atmospheric and noise pollution locally around airports. Even when the engines are run at low power it is generally necessary to apply the wheel brakes to prevent excessive ground taxi speeds, which leads to a high degree of brake wear particularly as the brakes tend to be cold prior to take-off. It is also to be noted that reversing a civil aircraft by using its main engines is not permitted.

Several autonomous taxi systems have been proposed in recent years for driving the wheels whilst the aircraft is on the ground. Any benefits from an autonomous taxi system must consider the fuel cost to the operator of aircraft flying with the extra mass of the ground taxi system. This means that the only practical solution is one that absolutely minimises the installed system mass. Most recent interest in autonomous ground taxi systems has focused on installing drive motors on the landing gear wheel axle. These proposed systems have several potential drawbacks.

Since brakes are installed within the wheels of aircraft main landing gear, this region is very congested and so it is difficult to install drive motors on the wheel axle of main landing gear. Therefore, development of these proposed systems has generally been limited to the nose landing gear. Nose landing gear support low vertical load (approximately 5% of the aircraft weight) during ground taxi operations, which could lead to traction problems when the wheels are driven. This is particularly the case when the aircraft centre of gravity is towards its aft limit and when the ground surface is slippery, e.g. when wet or icy.

Most landing gear have a shock-absorbing main leg with a sprung part attached to the aircraft and an un-sprung part which carries the wheel(s). Any drive system which is mounted on the wheel axle (i.e. on the un-sprung part of the landing gear) will increase the un-sprung mass of the landing gear. An increase to the un-sprung mass of the landing gear is undesirable from a dynamic response perspective where this could result in high loads being induced into the landing gear and aircraft structure. Significant strengthening of the landing gear and/or aircraft structure may be required to support these load increases. Furthermore the un-sprung landing gear components experience significantly higher vibration and acceleration loads than the sprung parts. For example, the accelerations on the sprung parts may be around 3.5 g to 5 g, whereas the accelerations on the un-sprung parts may be around 50 g to 60 g. Therefore, any drive system which is fixedly mounted on the un-sprung parts will need to be very robust. This is unlikely to lead to a mass optimised solution.

Furthermore, any drive system which is installed coaxial with the wheel axle cannot easily be removed. Not only is this an important consideration for maintenance purposes but studies have indicated that the benefits of even lightweight autonomous taxi systems may only be observed for the shorter range operations where an aircraft spends a higher proportion of its time taxiing. It would therefore be desirable to be able to quickly install and remove the majority of the autonomous taxi system equipment from the aircraft so as to optimise the aircraft economics in the event of longer range operations. This is generally not possible with an integrated drive system installed coaxial with the wheel axle.

U.S. Pat. No. 3,762,670 describes a landing gear wheel drive system including a pair of drum members arranged to move into friction driving engagement with the periphery of the tyres of the landing gear wheels for driving the wheels whilst the aircraft is on the ground. The drum members are mounted on a rotating shaft and a motor is connected to the shaft via a gearing mechanism. Most of the weight of these parts is supported by the sprung part of the landing gear main leg. Whilst this document addresses some of the short-comings of the prior art axle mounted wheel drive systems, the roller pressures on the tyre necessary to move the aircraft are considered to be so high as to lead to unacceptable damage to the tyre surface. In addition, the shaft carrying the drum members is highly loaded in bending and therefore will need to be massive or it will suffer fatigue. Therefore, this design is also unlikely to lead to a mass optimised solution, necessary for practical application.

SUMMARY OF THE INVENTION

A first aspect of the invention provides an aircraft landing gear comprising:
  a shock-absorbing main leg having a sprung part for attachment to an aircraft and an un-sprung part including a slider and an axle carrying at least one wheel, the wheel having a toothed ring gear;
  a drive transmission mounted externally on the sprung part, or on the un-sprung part, of the main leg, the drive transmission having at least one motor and a drive pinion for meshing with the toothed ring of the wheel; and
  an actuator for lifting the drive transmission into and out of driving engagement with the toothed ring and for maintaining the driving engagement as the landing gear deflects during a ground taxiing operation.

A further aspect of the invention provides a method of operating the aircraft landing gear according to the first aspect, the method comprising driving the wheel in rotation by supplying power to the motor and engaging the drive transmission with the wheel via the toothed ring as the landing gear deflects during a ground taxiing operation.

The invention is advantageous in that it provides the potential for a mass optimised solution which has a low impact on the aircraft and landing gear baseline structure (i.e. an aircraft with a conventional landing gear without a driven wheel). The landing gear is changed little from a conventional landing gear, since the drive transmission is mounted externally. By using a drive pinion in meshing engagement with a toothed ring on the wheel, secure driving engagement is ensured without damage to the tyre on the wheel, and driving torque load paths are optimised. Given the very high acceleration experienced by the wheel during touch down, it is necessary to provide for disengagement of the drive transmission from the wheel using the actuator. There will be some deflection in the landing gear in response to grounds loads, and so it is important that the actuator can maintain the driving engagement during this movement.

Preferably, the drive transmission is detachably mounted on the main leg. The drive transmission can therefore be removed for maintenance and/or when the aircraft is to be used for long range operations where it may not be economic to use the drive transmission due to its weight penalty in cruise.

The landing gear may further comprise an articulating mechanism pivotally mounted on the sprung part, or on the un-sprung part, of the main leg, wherein the articulating mechanism is connected to the actuator and supports the drive transmission.

The articulating mechanism pivot axis may be configured to tilt relative to the main leg. This may be achieved using spherical or flexible hearings, for example, at the mounting point(s) on the main leg which support the drive transmission. This ensures that the driving engagement can be maintained as the wheel axis of rotation rolls relative to the vertical due to deflections in the tyre, or uneven ground.

The toothed ring and the drive pinion may have associated matching follower surfaces. The follower surfaces come together when the actuator presses the drive pinion into meshing engagement with the toothed ring, and act to control the orientation of the two gears relative to one another. This too helps to ensure that the driving engagement can be maintained.

The drive pinion may include a constant-velocity joint This too helps to ensure that the driving engagement can be maintained.

The drive pinion and toothed ring may be in a sealed environment. This protects against contamination from environmental debris, which may affect the endurance life of the gears. For example, a brush type seal, or a flexible, possibly PFTE, type running seal may be used.

The landing gear may have at least two of the driveable wheels. In this case, the wheels may each have a toothed ring gear, and the drive transmission may include two drive pinions each for meshing with a respective one of the toothed rings. The drive transmission may include two motors, each for driving a respective one of the drive pinions. Alternatively, the drive transmission may include a differential drive connected between the motor(s) and the drive pinions.

The toothed ring may be disposed on the outer diameter of the wheel hub. The toothed ring may be integrally formed with the hub, or mounted thereto.

The motor may be electric. Alternatively, it may be hydraulic and may be, for example, of a radial piston type.

The drive transmission may include a toothed drive belt. This may be used to provide a lightweight, compact gearing solution.

The toothed ring preferably has a larger diameter than the drive pinion to develop a significant torque magnifying gear ratio. By making use of the large hub diameter in this way, a mass optimised solution can be achieved.

The drive transmission may be mounted externally on the sprung part of the main leg, and the actuator may be adapted to maintain the driving engagement between the drive pinion and the toothed ring as the sprung and un-sprung parts of the main leg move relative to one another during the ground taxiing operation. This may be of particular benefit as the un-sprung mass of the landing gear may be almost unchanged from the baseline landing gear.

Alternatively, the drive transmission may be mounted on the un-sprung part of the main leg. For example, the drive transmission may be mounted on the slider and/or on the axle. For a bogie landing gear, the drive transmission may additionally or alternatively be mounted on the bogie. Although the un-sprung mass of the landing gear will be increased by attachment of the drive transmission, the drive transmission may be partially isolated from the high vibration and acceleration experienced by the un-sprung part of the landing gear, e.g. by the provision of a compliant mounting.

When incorporated on an aircraft, the landing gear may be used with a power and control system for supplying power to, and controlling operation of, the drive transmission.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
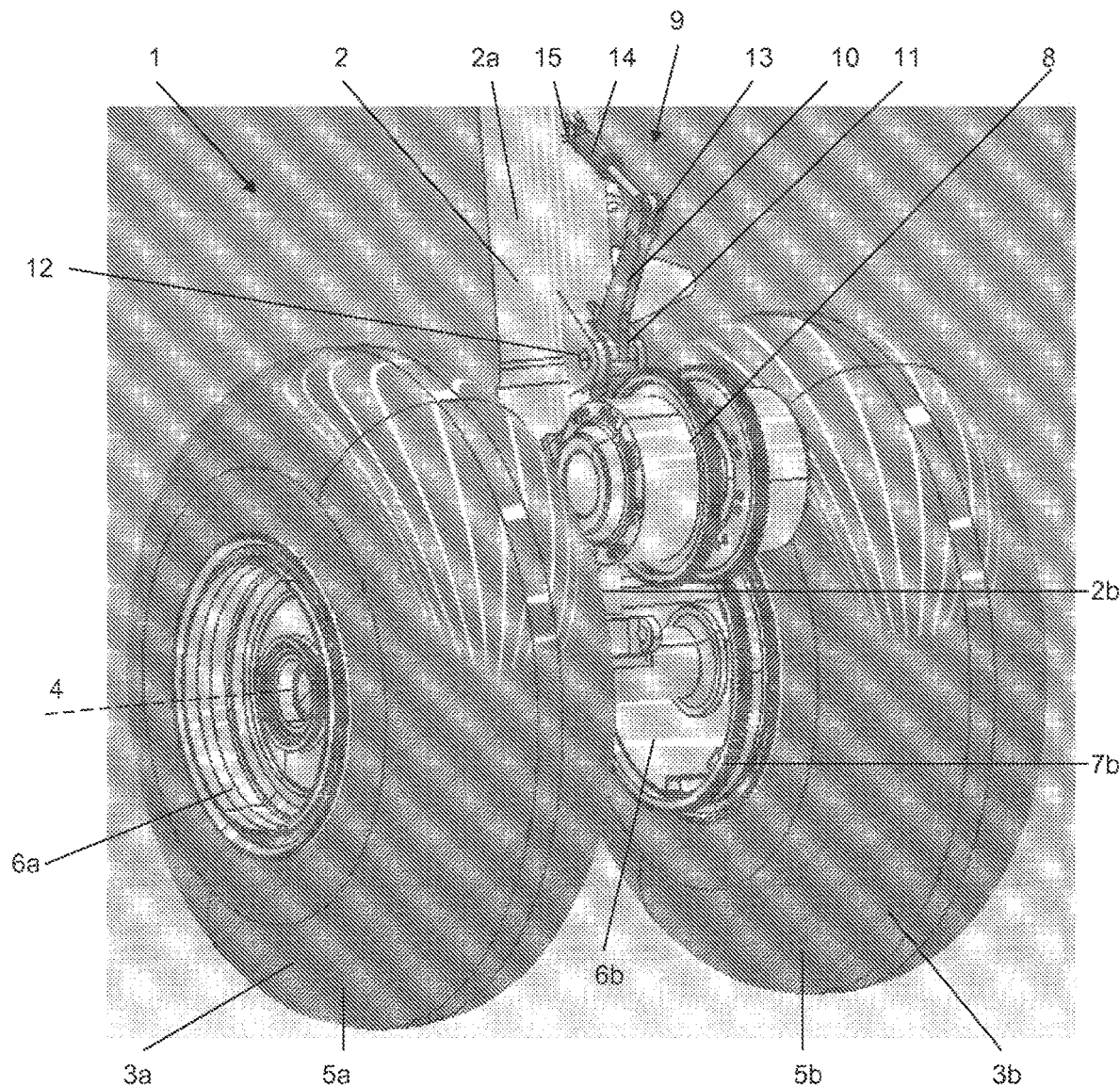
FIG. 1 illustrates a landing gear in accordance with a first embodiment.

FIG. 1 illustrates a landing gear 1 in accordance with a first embodiment. The landing gear 1 includes a telescopic shock-absorbing main leg 2 including an upper telescopic part 2a (main fitting) and a lower telescopic part 2b (slider). The upper telescopic part 2a is attached to the remainder of an aircraft by its upper end (not shown). The lower telescopic part 2b supports an axle carrying a pair of wheels, one on either side of the main leg 2. The wheels 3a, 3b are mounted for rotation about a common wheel axis 4 with respect to the main leg 2. The upper part 2a is disposed above the shock-absorbing components inside the main leg and so will hereafter be referred to as the "sprung" part. The lower part 2b is disposed beneath the shock-absorbing components and so will hereafter be referred to as the "un-sprung" part, as is conventional.

Each wheel 3a, 3b includes a tyre 5a, 5b supported by a hub 6a, 6b. A toothed ring gear 7a, 7b is mounted to the outer diameter of each hub 6a, 6b (see also FIG. 4). The teeth of the ring gears 7a, 7b face radially outwardly. The landing gear 1 further includes a drive transmission 8 mounted externally on the sprung part 2a of the main leg 2. The drive transmission 8 is supported by an articulating mechanism 9 (see FIG. 2). The articulating mechanism 9 includes an elbow crank 10 having a first arm 10a and a second arm 10b. The arms 10a, 10b of the elbow crank 10 are set at an obtuse angle on either side of a hinge point 11. The hinge point 11 is pivotally received in a clevis bracket 12 mounted on the sprung part 2a of the main leg 2. The first arm 10a of the elbow crank 10 is pivotally connected at its distal end 13 to one end of a linear actuator 14. The other end of the actuator 14 is pivotally received in a clevis bracket 15 mounted on the sprung part 2a of the main leg 2 above the hinge point 11.

Figure 2:
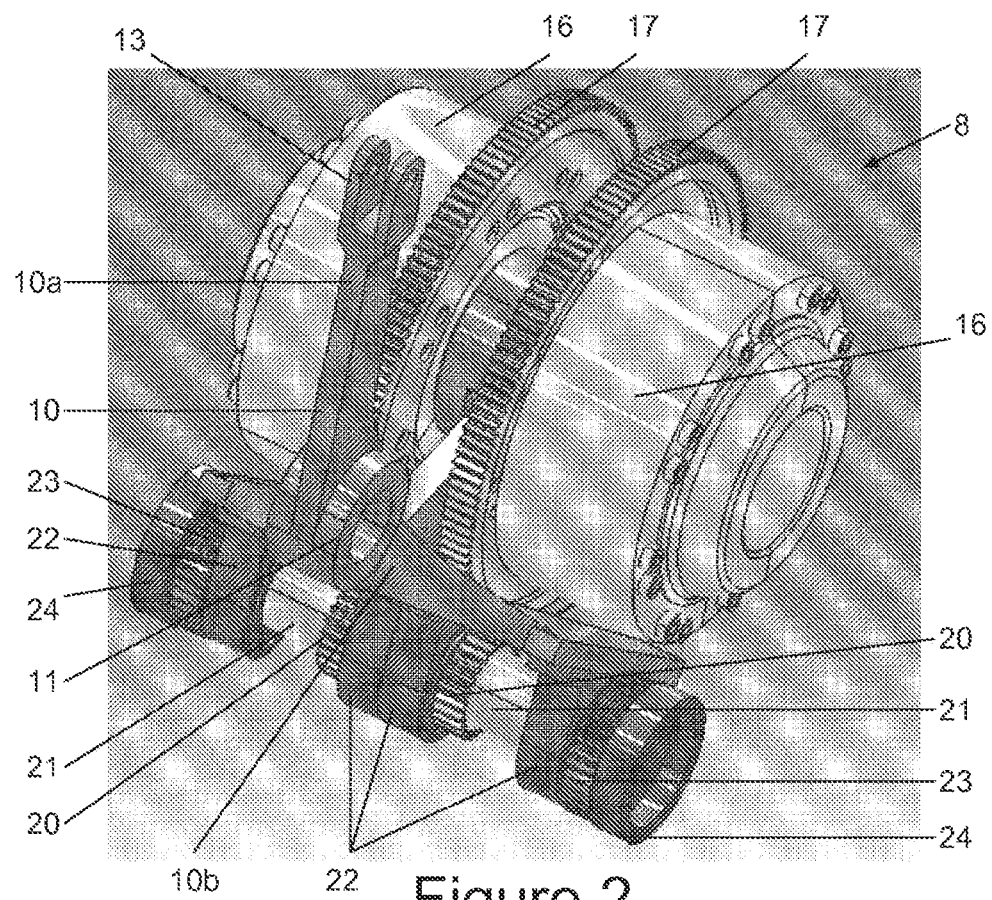
FIG. 2 illustrates the drive transmission.
Figure 3:
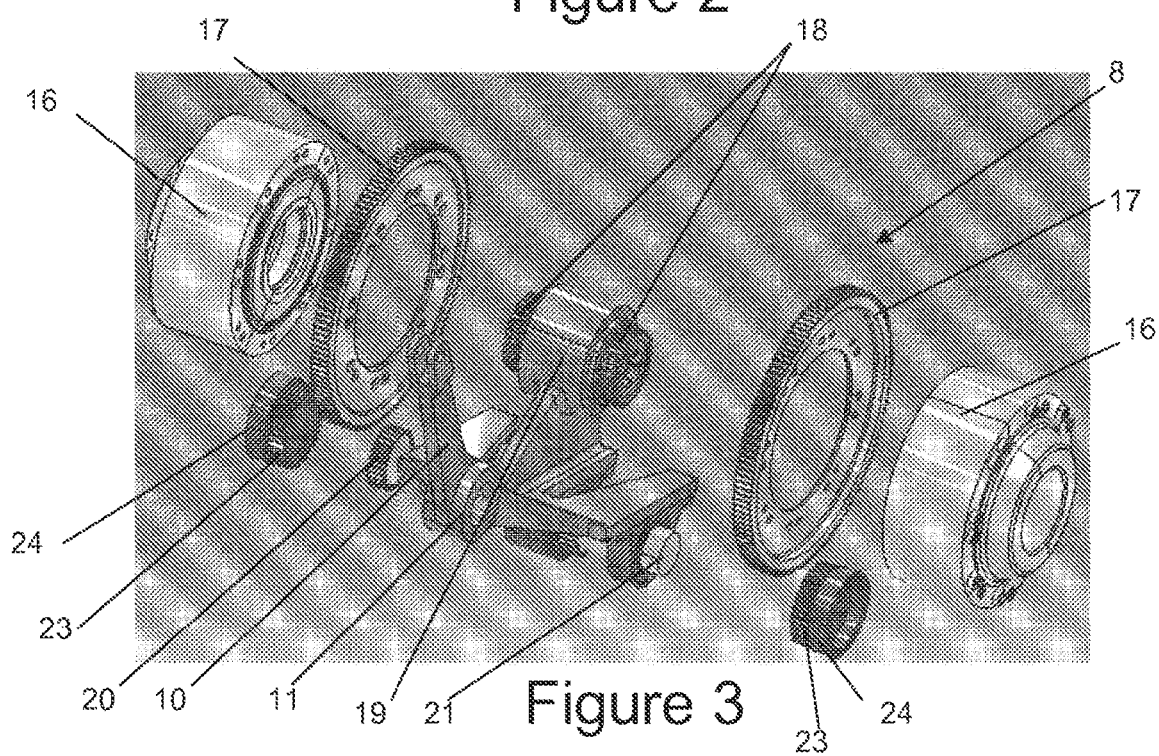
FIG. 3 illustrates an exploded view of the drive transmission of FIG. 2.

The second arm 10b of the elbow crank 10 supports the drive transmission 8, which will now be described in detail with reference to FIGS. 2. and 3. The drive transmission 8 in accordance with the first embodiment includes two independent drive trains arranged symmetrically. Each drive train includes a radial piston type hydraulic motor 16 fixed to a large diameter drive gear 17. Each motor 16 has a stator part received on respective co-axial splines 18 disposed on either side of a mounting bracket 19 supported by the crank 10. The stator part of the motor 16 is therefore fixed in rotation with respect to the mounting bracket 19, whereas the rotor part of the motor 16 is fixed to its large diameter gear 17. The large diameter gear 17 is in meshing engagement with a respective small diameter gear 20. The small diameter gear 20 is supported by a pinion shaft 21. The pinion shaft 21 is supported in bearings by lugs 22 extending from the crank 10. Also supported on each pinion shaft 21 is a respective drive pinion 23 and pinion follower 24 fixed in rotation with their respective small diameter gear 20.

Figure 4:
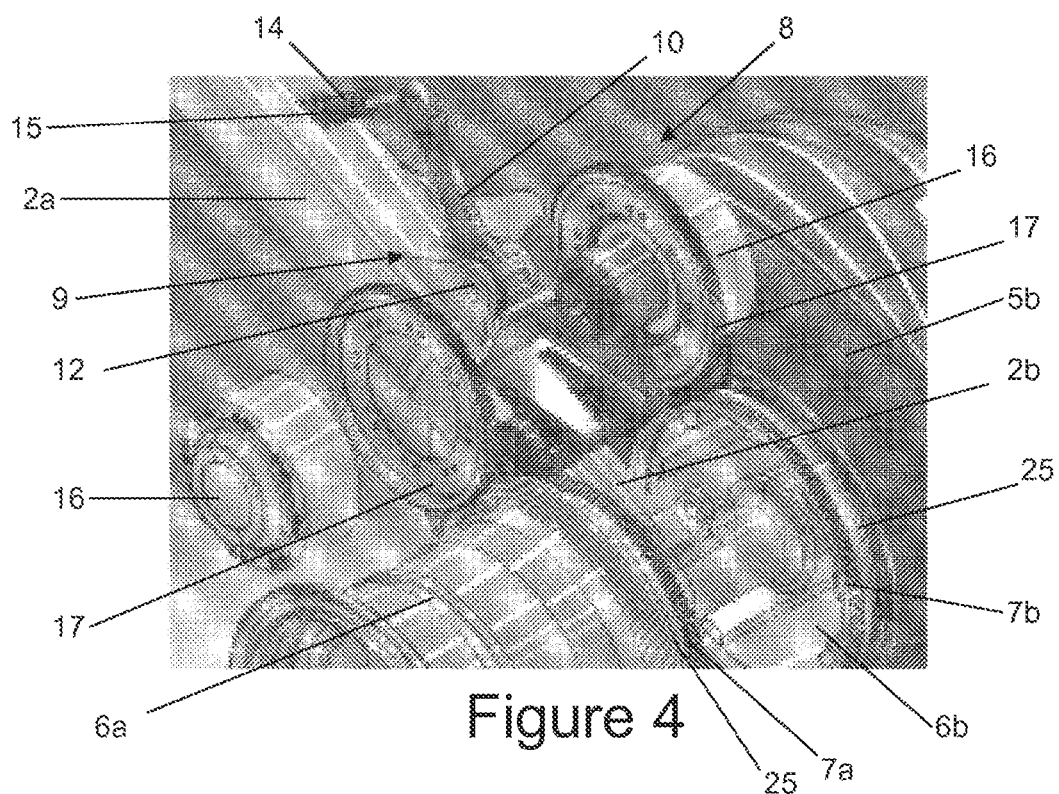
FIG. 4 illustrates a partially exploded view of the drive transmission installed on the landing gear (with one tyre removed for clarity)

FIG. 4 shows a partially exploded view of the landing gear 1 with the tyre 5a removed to reveal the toothed ring 7a. Adjacent to each toothed ring 7a, 7b is a respective toothed ring follower 25.

Operation of the drive transmission 8 to drive the wheels 3a, 3b in rotation will now be described. The actuator 14 is used to raise and lower the drive pinions 23 of the drive transmission 8 into and out of driving meshing engagement with the toothed rings 7a, 7b. The actuator 14 is of a linear type and so retraction of the actuator 14 causes the distance between the actuator mounting bracket 15 and the distal end 13 of the crank 10 to shorten, which causes the crank 10 to rotate about its pivot point 11 to thereby lift the drive transmission 8 in an anticlockwise arc (as viewed in FIG. 1). When the actuator 14 is retracted, the drive pinions 23 are lifted out of meshing engagement with the toothed rings 7a, 7b on the wheel hubs 6a, 6b. With the drive transmission 8 disengaged from the wheels 3a, 3b, the landing gear 1 may be operated in a conventional manner for takeoff and landing. It is important that when the drive transmission 8 is disengaged from the wheels 3a, 3b the drive transmission 8 is lifted sufficiently far away from the toothed rings 7a, 7b such that upon landing, the un-sprung part 2b of the main leg 2 which carries the wheels 3a, 3b can telescope along its full path of travel within the sprung part 2a of the main leg 2, without the toothed rings 7a, 7b impacting the drive transmission 8.

When the aircraft is on the ground the actuator 14 may be extended causing the drive transmission 8 to move in a clockwise arc until the drive pinions 23 come into meshing engagement with the toothed rings 7a, 7b. With the drive transmission 8 engaged with the wheels 3a, 3b via the toothed rings 7a, 7b the motors 16 may be energised to drive the wheels 3a, 3b in rotation about their axis 4, and thereby drive the aircraft over the ground. The drive transmission 8 can supply sufficient driving torque to the wheels 3a, 3b to drive the aircraft over the ground without the use of the main aircraft engine(s). Since the two wheels 3a, 3b have independent drive trains in the drive transmission 8, the wheels 3a, 3b can rotate at different speeds which is beneficial, for example, when the aircraft is turning on the ground. The diameter of the drive pinions 23 is much smaller than the diameter of the toothed rings 7a, 7b, which generates a significant torque magnifying gear ratio between the drive motors 16 and the toothed rings 7a, 7b.

To ensure secure meshing engagement between the drive pinions 23 and the toothed rings 7a, 7b, the actuator 14 is extended to urge the drive transmission 8 onto the toothed rings 7a, 7b. This is important since ground loads through the landing gear 1 whilst the aircraft is taxing will cause sonic deflection in the shock-absorbing main leg 2, giving rise to relative movement between the un-sprung part 2b within the sprung part 2a. This relative movement could be around 50 mm or so.

To prevent excessive wear on the drive pinions 23, and to ensure correct alignment of the drive pinions 23 with the toothed rings 7a, 7b, a follower mechanism is employed. As mentioned previously, the drive transmission 8 includes a pinion drive follower 24 on each of the pinion shafts 21 just outboard of each of the drive pinions 23. The drive pinion followers 24 have an outer diameter slightly larger than the outer diameter of the drive pinions 23 and the drive pinion followers 24 have a smooth outer surface. The drive pinion followers 24 bear against the toothed ring followers 25, which also have a smooth outer surface. The toothed ring followers 25 have an outer diameter slightly less than the diameter of the toothed rings 7a, 7b and are disposed just outboard of the toothed rings 7a, 7b. When the drive pinions 23 are brought into meshing engagement with the toothed rings 7a, 7b, the smooth outer surfaces of the pinion followers 24 come into sliding engagement with the smooth outer surfaces of the toothed ring followers 25 and the inboard edges of the pinion followers 24 bear against the outboard edges of the toothed rings 7a, 7b. The followers 24, 25 therefore ensure good lateral and radial alignment of the drive pinions 23 with the toothed rings 7a, 7b.

Deflections in the tyres 5a, 5b, as well as local unevenness in the ground surface, can cause the wheel axis of rotation 4 to tilt (i.e. roll) in the transverse vertical plane The driving engagement between the drive transmission 8 and the ring gears 7a, 7b is insensitive to this motion for relatively small angles, for example, up to around +/−12 degrees. The follower mechanism using the follower pairs 24, 25 can only accommodate this rolling motion if the drive transmission 8 is permitted to roll with the axis 4. The mounting point 11 of the articulating mechanism 9 is received in spherical or flexible bearings in the mounting bracket 12 to allow the drive transmission 8 to roll with the wheel axis 4. Since the articulation mechanism 9 is connected to actuator 14, the actuator is also mounted in spherical or flexible bearings in its mounting bracket 15 on the main leg 2.

The spherical bearings together with the follower mechanism act together to ensure that when the drive transmission 8 is urged onto the toothed rings 7a, 7b by the actuator 14, secure driving engagement can be maintained between the drive transmission 8 and the wheels 3a, 3b under the deflective loads imposed on the wheels. The drive pinions 23 may optionally further include a constant velocity joint to help maintain the driving engagement.

The drive transmission 8, the articulation mechanism 9 and the actuator 14 are mounted on the main leg 2 by the mounting brackets 12 and 15. The mounting brackets 12 and 15 include release mechanisms to permit detachment of the drive transmission 8, the articulation mechanism 9 and the actuator 14 from the main leg 2. When these items are removed, the mass of the landing gear 1 is similar to that of a conventional landing gear. This is particularly beneficial as it may only be economic to use the drive transmission 8 to drive the wheels 3a, 3b where the aircraft is to be used for short haul operations, where the aircraft spends more of its time on the ground. For long haul operations, the drive components may be removed.

Although not shown in the Figures, the drive pinions 23 and the toothed rings 7a, 7b may be disposed in a sealed environment to protect these components from environmental debris, which may affect their endurance life. A simple sealing arrangement may include an open shroud around each of the drive pinions 23 and the toothed rings 7a, 7b, which come together to form a closed shroud around each drive pinion and toothed ring pair. The two parts of the shroud may be sealed with a brush type seal, or a flexible, possibly PTFE, running seal, for example. It will be appreciated that other sealing arrangements may be used.

The landing gear 1 may be used to drive the aircraft forward or in reverse in airport gate areas and in ground taxi operations. The aircraft may therefore be moved on the ground without an airport tug and without using the main aircraft engine(s). By eliminating or reducing the use of the aircraft engines for moving the aircraft on the ground, there are several environmental and economic benefits including noise and pollution reduction; lower engine run time; reduced chance of foreign object damage to the engines, which can suck up debris when run on the ground; and a reduction in fuel burn. In addition, removing the reliance on an airport tug may reduce delays and improve airport safety.

The motors 16 of the drive transmission 8 and the actuator 14 may be connected to existing, or dedicated, aircraft systems. Operation of the drive transmission 8 to bring it into and out of driving engagement with the wheels 3a, 3b may be controlled from either the aircraft cockpit, or remotely from ground based vehicles, or by air traffic controllers using, e.g. satellite links.

Whilst in the first embodiment described above, the drive transmission 8 includes a pair of hydraulic motors 16, it will be appreciated that various other types of drive transmission may alternatively be used on the landing gear 1. Second to fifth embodiments of the invention will now be described with reference to FIGS. 5 to 8 where like parts to those of the first embodiment are denoted by like reference numerals.

Figure 5:
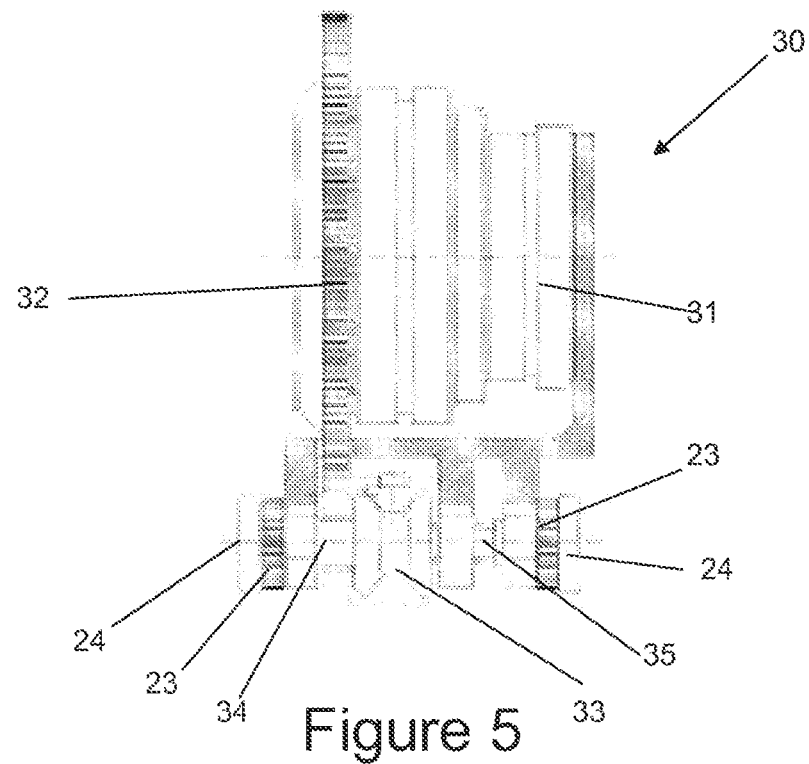
FIG. 5 illustrates a drive transmission in accordance with a second embodiment.

FIG. 5 shows the drive transmission in accordance with the second embodiment. The drive transmission 30 may be installed in place of the drive transmission 8 on the landing gear 1, shown in FIG. 1. The drive transmission 30 has identical drive pinions 23 and pinion followers 24 to the drive transmission 8. Accordingly, the drive transmission 30 may be operated in an identical manner to the drive transmission 8 of the first embodiment. The drive transmission 30 differs from the drive transmission 8 in that it has a single hydraulic motor 31 which drives a large diameter gear 32 which is connected to a differential drive 33. The outputs of the differential drive 33 are connected to independent pinion drive shafts 34, 35, which each carry in rotation one of the drive pinions 23 and one of the pinion followers 24.

Figure 6:
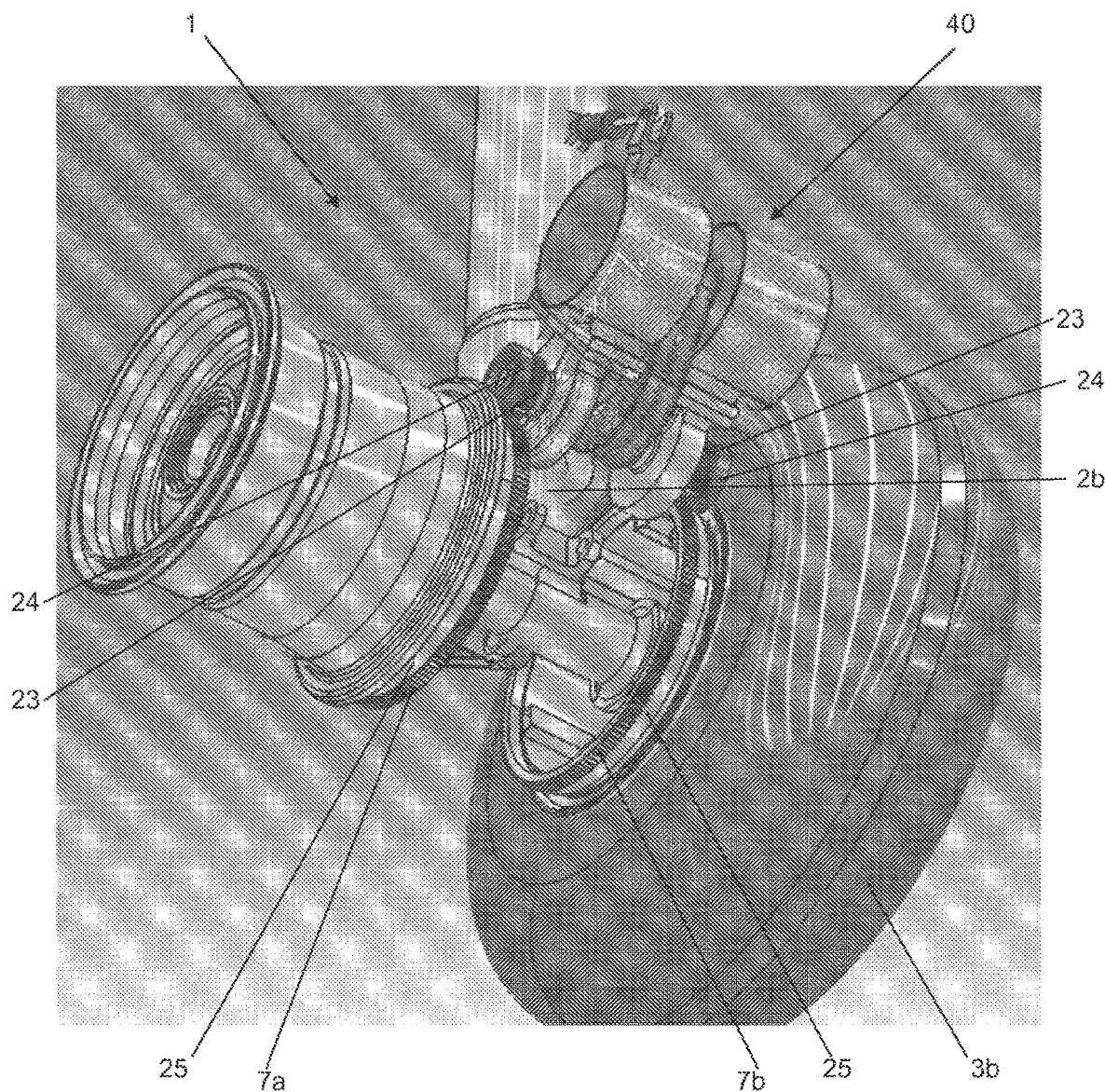
FIG. 6 illustrates a drive transmission in accordance with a third embodiment installed on the landing gear (with one tyre removed for clarity)

FIG. 6 illustrates a drive transmission in accordance with a third embodiment, which may be used in place of the drive transmission 8 on the landing gear 1. The tyre 5a has been removed in FIG. 6 for clarity. The drive transmission 40 includes a pair of drive pinions 23 and corresponding pinion followers 24 identical to those of the drive transmission 8 of the first embodiment. Accordingly, the drive transmission 40 may be used in a identical manner to the drive transmission 8.

Figure 7:
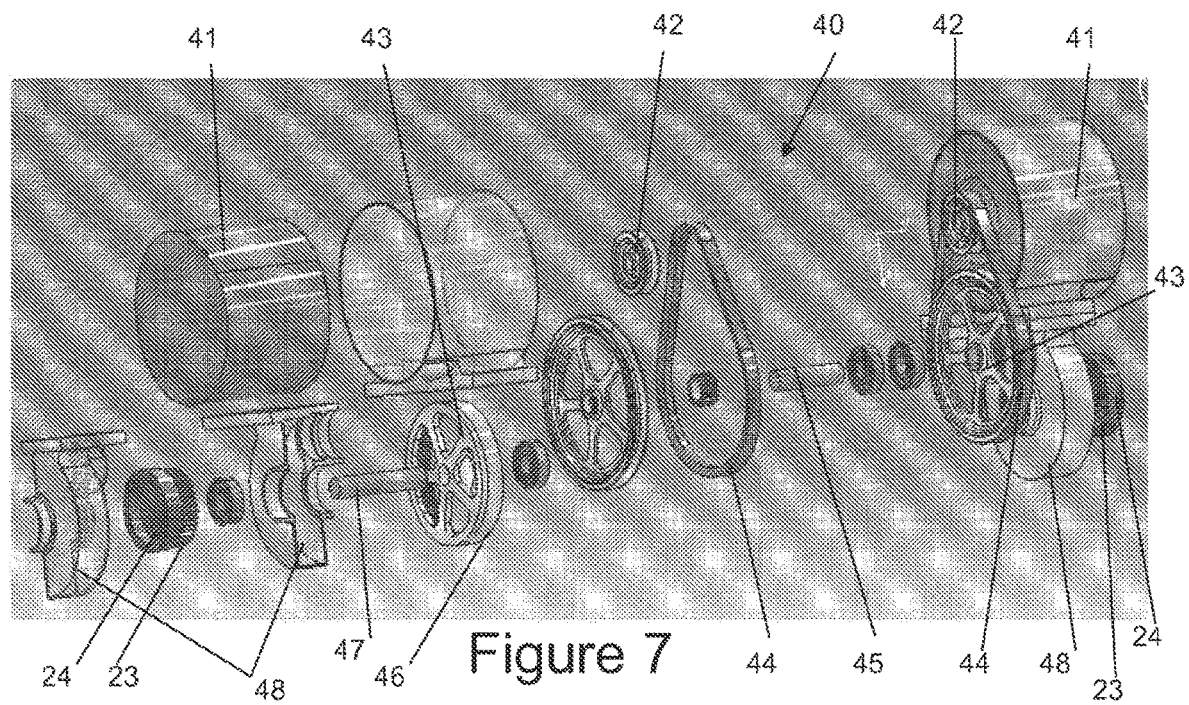
FIG. 7 illustrates an exploded view of the drive transmission of FIG. 6.
Figure 8:
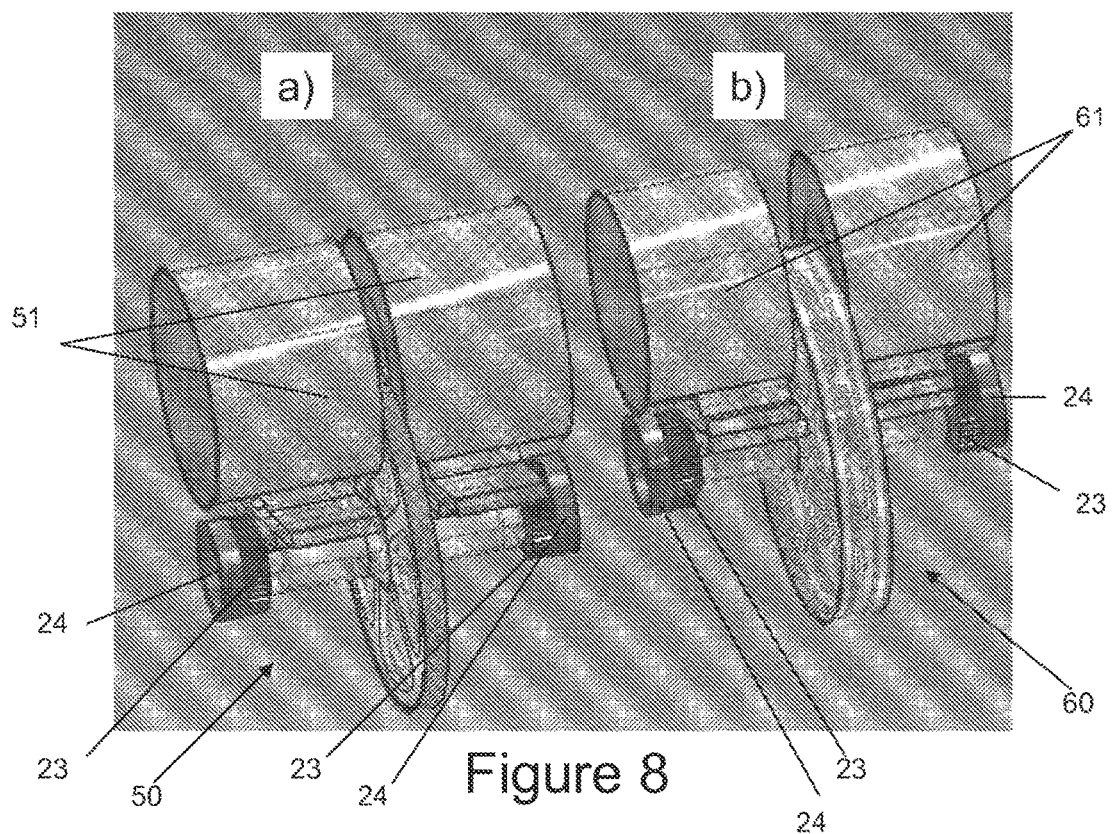
FIGS. 8a) and b) illustrate drive transmissions in accordance with fourth and fifth embodiments respectively.

The drive transmission 40 will now be described in detail with reference to FIG. 7, which illustrates an exploded view of the drive transmission 40. Whereas the drive transmissions of the first and second embodiments include one or more hydraulic motors, the drive transmission 40 includes a pair of electric motors 41. Each motor 41 outputs to a small diameter toothed gear 42 which is connected to a large diameter toothed gear 43 via a lightweight toothed drive belt 44 to create a first reduction stage. The large diameter gear 43 is mounted on a gear shaft 45 which drives a second reduction stage 46 that outputs to a drive shaft 47 which carries the drive pinion 23 and pinion follower 24. Electric motors improve in both torque and power density as they run at higher speeds and hence two reduction stages are provided in the drive transmission 40 to reduce the speed and increase the torque to levels appropriate for aircraft taxi operations. The relatively low torque and moderate speed in the first stage is suitable for use with the toothed drive belt 44, which enables a particularly lightweight compact design. The second reduction stage 46 operates in a sealed and lubricated environment within casing 48. The proportionally smaller drive pinion 23 compared to the large diameter tooth rings 7a, 7b provides the final gear reduction stage to enable use of the electric motors 41 without compromising the mass optimisation of the drive transmission 40. As can be seen from FIG. 7, the drive transmission 40 includes two independent drive trains for driving the two drive pinions 23 in an analogous manner to the hydraulic drive transmission 8 of the first embodiment.

FIGS. 8a and 8b illustrate two further alternative drive transmissions 50 and 60 of the fourth and fifth embodiments respectively. The drive transmissions 50 and 60 can similarly be used instead of the drive transmission 8 of the first embodiment on the landing gear 1. The drive transmission 50 includes a pair of electric motors 51 which drive a simple single stage reduction gear 52. The motors 51 operate at a slower output speed compared to the motors 41 and hence suffer slightly in terms of power density. However, the simple geared arrangement is relatively lightweight. The overall size of the drive transmission 50 is somewhat larger than the drive transmission 40, which may limits its application on some landing gear.

The drive transmission 60 includes electric motors 61 similar to the motors 41 of the third embodiment. These drive a twin stage geared arrangement 62 including planetary gears which output to the drive pinions 23. The drive transmission 60 provides a more compact arrangement compared to the drive transmission 50 but is heavier due to the twin stage geared arrangement 62.

Figure 9:
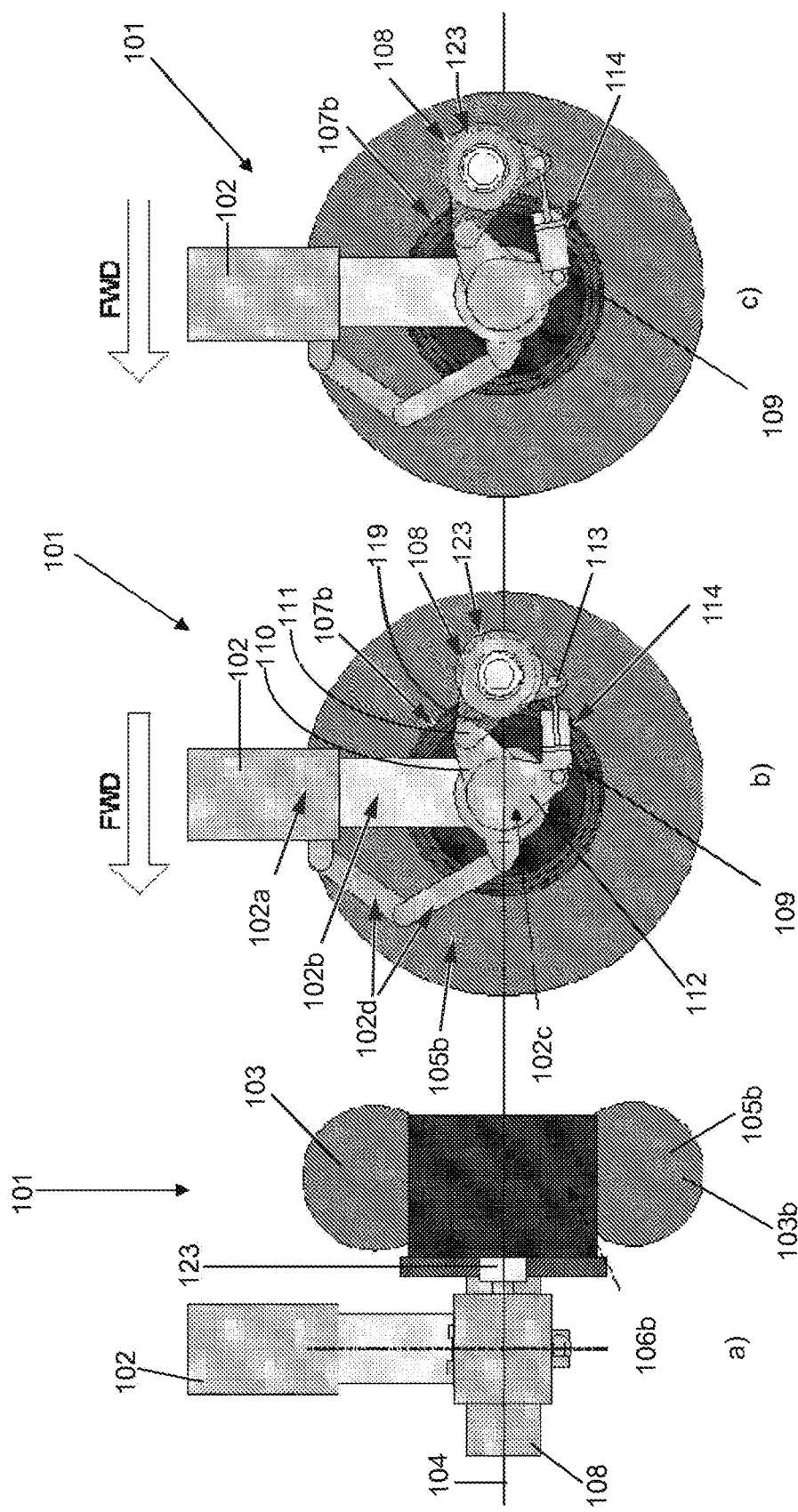
FIG. 9 illustrates schematically a landing gear in accordance with a sixth embodiment, in which a) shows a rear view, b) shows a side view with the drive transmission engaged, and c) shows a side view with the drive transmission disengaged.

In the embodiments described above, the drive transmission is mounted on the sprung part of a shock-absorbing main leg. FIG. 9 illustrates a landing gear 101 in accordance with a sixth embodiment, in which a drive transmission is mounted externally on the wheel axle. FIG. 9a) illustrates a rear view, FIG. 9 b) illustrates a side view with the drive transmission engaged, and FIG. 9 c) illustrates a side view with the drive transmission disengaged.

The landing gear 101 shares many features in common with the landing gear 1 described above and so only the differences between them will be described in the following.

The landing gear 101 includes a telescopic shock-absorbing main leg 102 including an upper telescopic part 102a (main fitting) and a lower telescopic part 102b (slider), with a torque link 102d between them. The lower telescopic part 102b supports an axle 102c carrying a pair of wheels 103, one on either side of the main leg 102. (note only wheel 103b is shown in FIG. 9 for clarity). The wheels are mounted for rotation about a common wheel axis 104 with respect to the main leg 102.

The wheel 103b includes a tyre 105b supported by a hub 106b. The other wheel (not shown) has a similar construction. A toothed ring gear 107b is mounted to the outer diameter of the hub 106b of each wheel. The teeth of the ring gears face radially outwardly.

The landing gear 101 has a drive transmission 108 mounted externally on the axle 102c. It will be appreciated that the drive transmission 108 could additionally, or alternatively, be mounted on the slider, or any other component of the un-sprung part 102b of the landing gear 101.

The drive transmission 108 shown in FIG. 9 may be any of the drive transmissions described in the first to fifth embodiments above. One of the drive pinions 123 of the drive transmission 108 is visible in FIG. 9.

The drive transmission 108 is supported from the axle 102c by an articulating mechanism 109. The articulating mechanism 109 includes support brackets 110, 112 a mounting bracket 119 and a linear actuator 114. The support bracket 110 extends from the axle 102c and has a hinge point 111. The mounting bracket 119 is pivotally connected to the hinge point 111. The actuator 114 is pivotally connected at one end to support bracket 112 extending from the axle 102c, and is pivotally connected at its other end to a distal end 113 of the mounting bracket 119. The mounting bracket 119 supports the drive transmission 108.

Operation of the drive transmission 08 to drive the wheels in rotation will now be described. The actuator 114 is used to raise and lower each drive pinions 123 of the drive transmission 108 into and out of driving meshing engagement with its respective toothed ring gear 107b.

The actuator 114 is of a linear type and so extension of the actuator 114 causes the distance between the support bracket 112 and the distal end 113 of the mounting bracket 119 to lengthen, which causes the mounting bracket 119 to rotate about its pivot point 111 to thereby lift the drive transmission 108 in an anticlockwise arc (as viewed in FIG. 9c)). When the actuator 114 is extended, each drive pinion 123 is lifted out of meshing engagement with its toothed ring gear 107b on the wheel hub 106b. With the drive transmission 108 disengaged from the wheels the landing gear 101 may be operated in a conventional manner for takeoff and landing.

When the aircraft is on the ground the actuator 114 may be retracted causing the drive transmission 108 to move in a clockwise arc (as viewed in FIG. 9b)) until the drive pinions 123 come into meshing engagement with the toothed ring gears 107b. With the drive transmission 108 engaged with the wheels via the toothed ring gears 107b the motors of the drive transmission 108 may be energised to drive the wheels 103 in rotation about their axis 104, and thereby drive the aircraft over the ground. The drive transmission 108 can supply sufficient driving torque to the wheels to drive the aircraft over the ground without the use of the main aircraft engine(s). Since the two wheels 103 have independent drive trains in the drive transmission 108, the wheels 103 can rotate at different speeds which is beneficial, for example, when the aircraft is turning (steering) on the ground. The diameter of the drive pinions 123 is much smaller than the diameter of the toothed rings 107b, which generates a significant torque magnifying gear ratio between the drive motors and the toothed rings 107b.

To ensure secure meshing engagement between the drive pinions 123 and the toothed rings 107b, the actuator 114 is retracted to urge the drive transmission 108 onto the toothed rings 107b. This is important since ground loads through the landing gear 101 whilst the aircraft is taxing will cause some deflection of the landing gear structure.

In the same way as for the first embodiment described above, to prevent excessive wear on the drive pinions 123, and to ensure correct alignment of the drive pinions 123 with the toothed rings 107b, a follower mechanism is employed. The drive transmission 108 includes a pinion drive follower on each of the pinion shafts just outboard of each of the drive pinions 123. The drive pinion followers are identical and operate identically to the drive pinion followers 24 described previously for the first to fifth embodiments.

Deflections in the tyres, as well as local unevenness in the ground surface, can cause the wheel axis of rotation 104 to tilt (i.e. roll) in the transverse vertical plane. The driving engagement between the drive transmission 108 and the ring gears 107b is insensitive to this motion for relatively small angles, for example, up to around +/−12 degrees. The follower mechanism can only accommodate this rolling motion if the drive transmission 108 is permitted to roll with the axis 104. The hinge point 111 of the articulating mechanism 109 is received in spherical or flexible bearings in the support bracket 110 and/or mounting bracket 119 to allow the drive transmission 108 to roll with the wheel axis 104. Since the articulation mechanism 109 is connected to actuator 114, each end of the actuator is also mounted in spherical or flexible bearings in the support bracket 112 and the mounting bracket 119.

The spherical bearings together with the follower mechanism act together to ensure that when the drive transmission 108 is urged onto the toothed rings 107b by the actuator 114, secure driving engagement can be maintained between the drive transmission 108 and the wheels 103 under the deflective loads imposed on the landing gear structure. The drive pinions 123 may optionally further include a constant velocity joint to help maintain the driving engagement.

The drive transmission 108, and the actuator 114 are mounted on the axle 102c, and these mountings may include release mechanisms to permit detachment of the drive transmission 108, and the actuator 114 from the axle 102c. When these items are removed, the mass of the landing gear 101 is similar to that of a conventional landing gear. This is particularly beneficial as it may only be economic to use the drive transmission 108 to drive the wheels 103 where the aircraft is to be used for short haul operations, where the aircraft spends more of its time on the ground. For long haul operations, the drive components may be removed.

Although not shown in the Figures, the drive pinions 123 and the toothed rings 107*b* may be disposed in a sealed environment to protect these components from environmental debris, which may affect their endurance life. A simple sealing arrangement may include an open shroud around each of the drive pinions 123 and the toothed rings 107*b*, which come together to form a closed shroud around each drive pinion and toothed ring pair. The two parts of the shroud may be sealed with a brush type seal, or a flexible, possibly PTFE, running seal, for example. It will be appreciated that other sealing arrangements may be used.

Use of the landing gear 101, and its drive transmission in particular, may be as described above with reference to the first to fifth embodiments.

Figure 10:
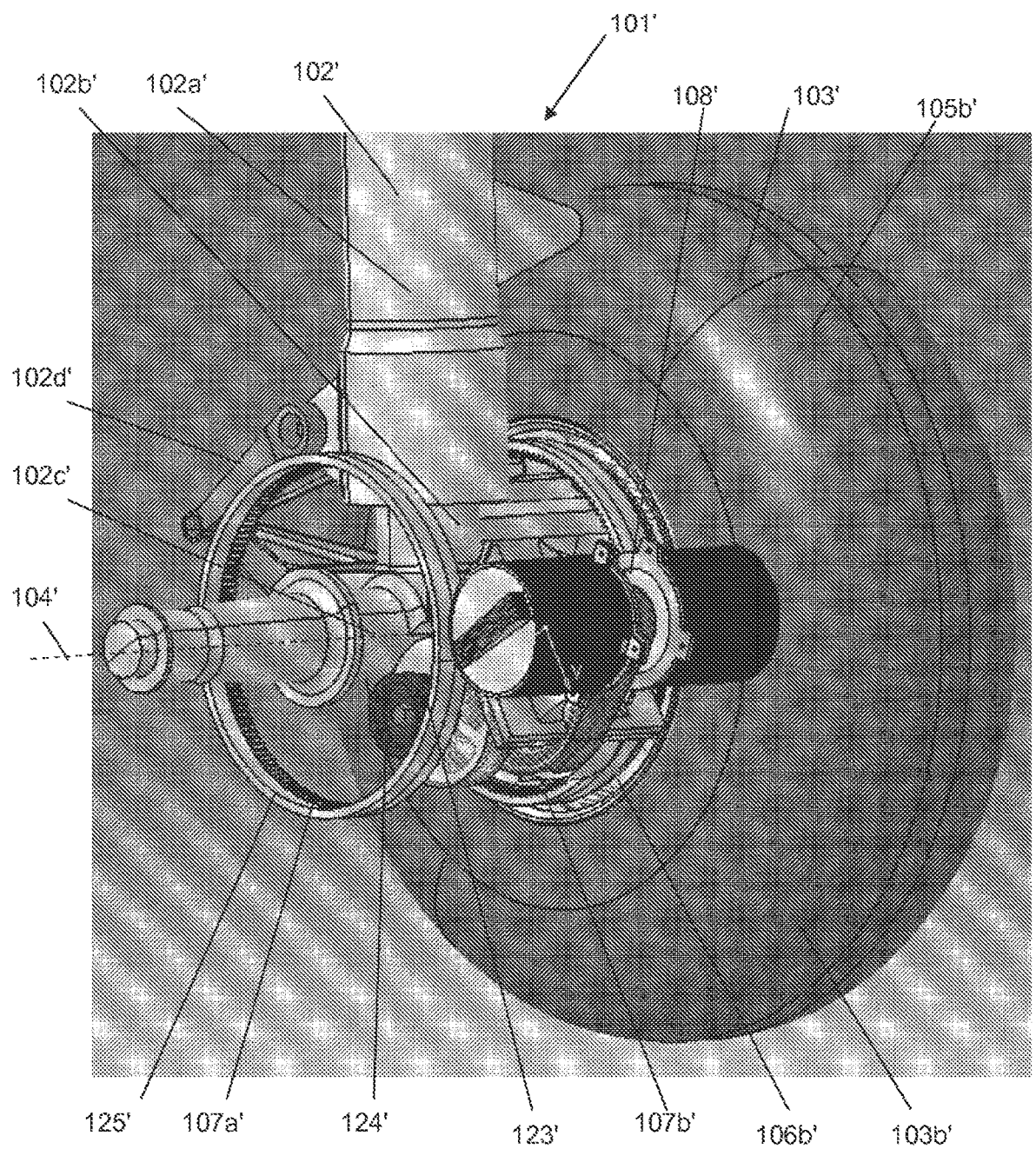
FIG. 10 illustrates a modified sixth embodiment in which the ring gears have radially inwardly facing teeth.

This sixth embodiment may be modified such that the teeth of the ring gears face radially inwardly, and the pinions of the drive transmission are adapted to be lifted into engagement with the ring gears from inside the diameter of the ring gears. FIG. 10 illustrates the modified sixth embodiment, where like reference numerals have been used to denote like parts with an additional prime. The only difference between FIGS. 9 and 10 is that in FIG. 10 the ring gears 107*a*' and 107*b*' have radially inwardly facing teeth, and that extension of the actuator (not visible in FIG. 10) corresponds to engagement of the drive transmission 108' and retraction of the actuator corresponds to disengagement of the drive transmission 108'. This modification may be limited to larger diameter wheel hubs due to space restrictions for the drive transmission.

Whilst in the embodiments described above the landing gear has two wheels, it will be appreciated that this invention is applicable to landing gears having a single wheel or multiple pairs of wheels on a bogie. In the case where the landing gear has multiple wheels, one or more of these may be driven wheels.

This invention may be employed in either nose or main landing gear, although it is preferably employed in main landing gear due to the higher traction between the wheels and the around.

Although the invention has been described above with reference to one or more preferred embodiments, it will be appreciated that various changes or modifications may be made without departing from the scope of the invention as defined in the appended claims.

The invention claimed is:

1. An aircraft landing gear comprising:
   an axle carrying at least one wheel having a wheel hub;
   a drive transmission having at least one motor and a drive pinion for operably directly engaging the wheel hub; and
   an actuator for lifting via pivoting the drive transmission into and out of driving engagement with the wheel hub.

2. The aircraft landing gear according to claim 1, further comprising a main leg for attachment to an aircraft, wherein the axle is supported by the main leg.

3. The aircraft landing gear according to claim 2, wherein the drive transmission is mounted externally on the main leg.

4. The aircraft landing gear according to claim 3, wherein the drive transmission is pivotally mounted on the main leg.

5. The aircraft landing gear according to claim 4, wherein the main leg is a shock-absorbing main leg including a sprung part for attachment to an aircraft and an un-sprung part including the axle.

6. The aircraft landing gear according to claim 1, wherein the drive transmission is mounted externally on the sprung part of the main leg.

7. The aircraft landing gear according to claim 1, wherein the actuator is arranged to maintain the driving engagement between the pinion and the wheel hub as the landing gear deflects during a ground taxiing operation.

8. The aircraft landing gear according to claim 1, wherein the drive transmission is detachably mounted.

9. The aircraft landing gear according to claim 2, further comprising an articulating mechanism pivotally mounted at an articulating mechanism pivot axis on the main leg, wherein the articulating mechanism is connected to the actuator and supports the drive transmission.

10. The aircraft landing gear according to claim 9, wherein the articulating mechanism pivot axis is configured to tilt relative to the main leg.

11. An aircraft landing gear according to claim 9, wherein the transmission, articulating mechanism, and actuator are mounted on the main leg by mounting brackets, the mounting brackets including release mechanisms to permit detachment of the drive transmission, articulating mechanism, and actuator from the main leg.

12. The aircraft landing gear according to claim 1, wherein the drive pinion includes a constant-velocity joint.

13. The aircraft landing gear according to claim 1, wherein the at least one motor is hydraulic.

14. The aircraft landing gear according to claim 1, wherein the at least one motor is electric.

15. An aircraft including the landing gear according to claim 1.

16. An aircraft according to claim 15, further comprising a power and control system for supplying power to, and controlling operation of, the drive transmission.

17. The aircraft landing gear according to claim 1, wherein the drive transmission includes two motors and two drive pinions, each one of the two motors is for driving a respective one of the two drive pinions.

18. The aircraft landing gear according to claim 1, wherein the drive transmission includes two drive pinions, and a differential drive connected between the at least one motor and the two drive pinions.

19. An aircraft landing gear, comprising:
   an axle carrying at least one wheel having a wheel hub;
   a drive transmission having at least one motor and a drive pinion for operably directly engaging the wheel hub; and,
   an actuator for lifting the drive transmission into and out of driving engagement with the wheel hub; and,
   wherein the drive transmission moves in a substantially radial direction with respect to the wheel hub.

20. An aircraft landing gear, comprising:
   an axle carrying at least one wheel having a wheel hub;
   a drive transmission having at least one motor and a drive pinion for operably directly engaging the wheel hub; and,
   an actuator for lifting the drive transmission and moving between positions spaced radially with respect to, and into and out of driving engagement with, the wheel hub.

* * * * *